Sept. 18, 1962 A. G. BODINE 3,054,463
ACOUSTIC APPARATUS FOR DRIVING PILES
Filed Jan. 24, 1958 2 Sheets-Sheet 1

INVENTOR.
ALBERT G. BODINE
BY
ATTORNEY

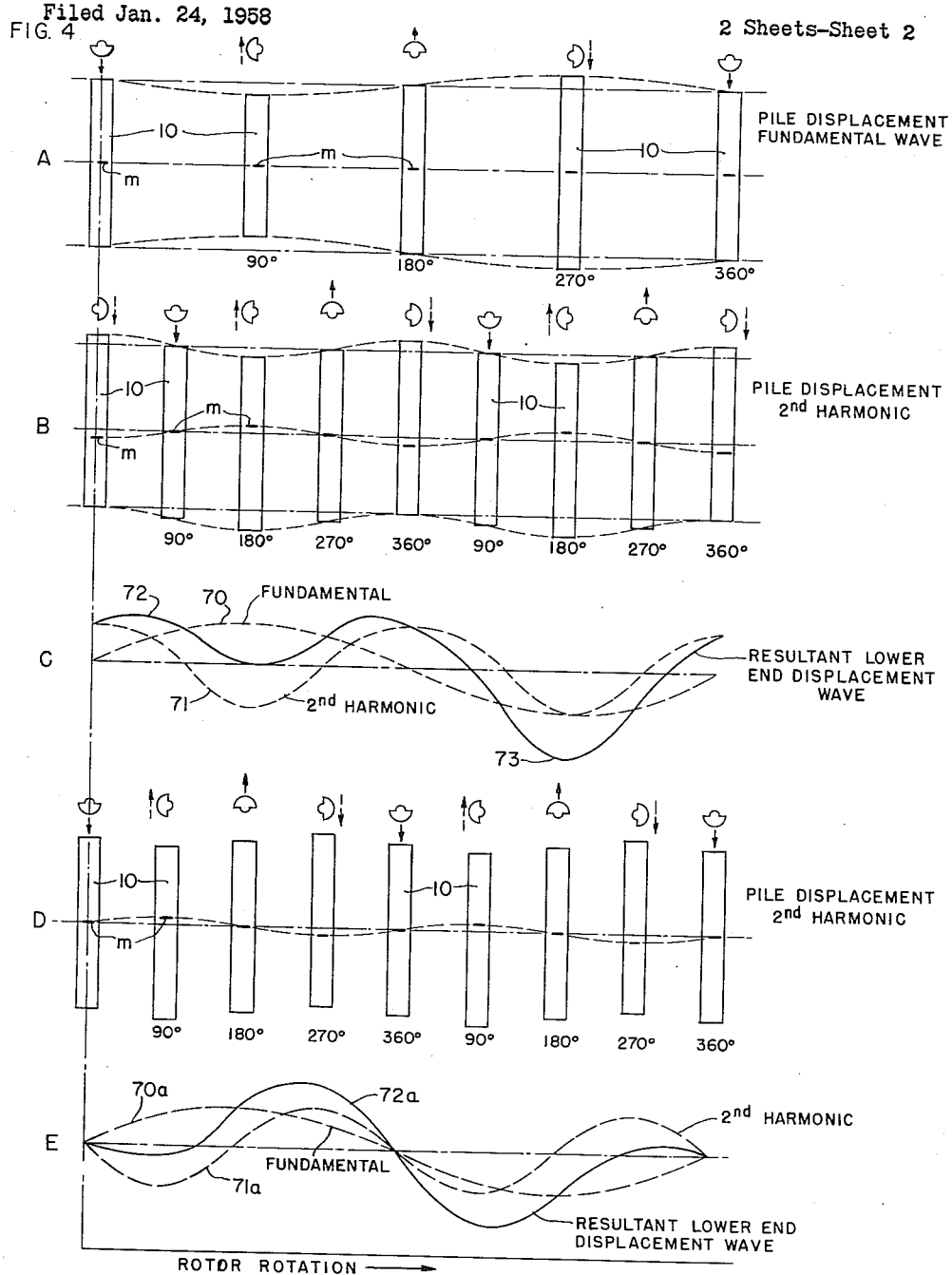

United States Patent Office 3,054,463
Patented Sept. 18, 1962

1

3,054,463
ACOUSTIC APPARATUS FOR DRIVING PILES
Albert G. Bodine, 13120 Moorpark St.,
Sherman Oaks, Calif.
Filed Jan. 24, 1958, Ser. No. 710,956
9 Claims. (Cl. 175—19)

This invention deals generally with methods and apparatus for driving piles, such as are used for building or other structural foundations, and is applicable to pile driving either into dry-surface earth, into marsh or tidewater ground, or in underwater situations. The piles in contemplation are those conventionally used, typically, steel H-section members, members of corrugated section, tubular section, or any other, and composed of steel, wood, pre-stressed concrete, plastic, etc.

The present application is a continuation-in-part of my prior application entitled, "Acoustic Method and Apparatus for Driving Piles," Serial No. 644,774, filed March 8, 1957. According to the disclosure in said patent application, a pile is driven by use at its upper end of an elastic wave generator, which sets the pile into standing wave vibration, and causes it, when rested on the earth, to be driven downwardly therein. The pile initially vibrates as a "free-free" bar, with a velocity antinode at each end, and a node at the midpoint. The pile, undergoing such standing wave action, alternately elastically elongates and contracts; and the resulting impacts of the lower end of the pile on the earth drive it down. As disclosed in said parent application, one or more additional velocity antinodes may appear along the pile, depending upon harmonic wave frequencies generated in relation to the length of the pile. Such additional antinodes maintain the pile in active vibration along increased stretches of its total length, and are thus useful in reducing static friction between the embedded length of the pile and the surrounding earth. Such reduction in static friction, of course, greatly facilitates the penetration of the pile deep into the earth.

An object of the present invention is the provision of a pile driving system of the general type mentioned, including wave generator means for positively introducing harmonic wave components, and therefore one or more additional velocity antinodes, into the wave pattern established along the pile.

I have found that the present invention may be practiced by simply connecting in a second wave generator, of proper wave frequency, so as to provide the desired additional velocity antinodes. That is to say, one generator may be used to generate the fundamental frequency standing wave providing a velocity antinode at each end of the pile; and an additional generator is used to provide a harmonic standing wave, for instance, the second harmonic, creating a velocity antinode at the location of the midpoint node tending to be produced by the first generator. I have also found that a wave generator may be used which produces both wave patterns simultaneously—the fundamental having a velocity antinode at each end, and the harmonic involving one or more additional velocity antinodes between the ends.

The invention is herein described particularly in a form using longitudinal modes of standing wave vibration in the pile. However, a torsional mode of vibration may be used for pile driving as disclosed in my aforementioned parent application, and the use of fundamental and harmonic frequency torsional modes of standing wave vibration are within the broad scope of the invention. Moreover, a torsional harmonic frequency mode may be used with a longitudinal fundamental frequency mode, and vice versa.

A number of benefits result from the invention. In the first place, as mentioned hereinabove, the additional

2 antinode or antinodes means an extended distribution of vibration along the pile, and therefore reduced static friction in intermediate regions of the pile which are somewhat dead or inactive when using a fundamental frequency standing wave characterized by a node at the mid-regions. The additional antinode or antinodes are very effective in overcoming static friction as the pile progresses into the earth.

In addition, by use of harmonic frequencies along with the fundamental, improved motion characteristics may be given the lower end of the pile, with increase in both the stroke amplitude and velocity with which the pile impacts against the earth.

A further object of the invention is the improvement of acoustic pile driving equipment, irrespective of harmonic frequency generation.

The invention will be more fully understood from the following detailed description of an illustrative embodiment thereof, reference for this purpose being had to the accompanying drawings, in which:

FIGURE 4 is a chart illustrative of wave action in the pile in accordance with the invention.

Figure 1:
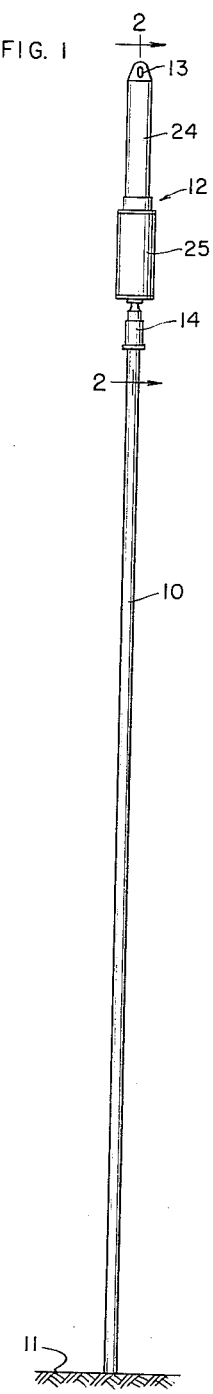
FIGURE 1 is a schematilc elevational view of a pile driving system in accordance with the invention, equipment for lifting the system into position for operation being omitted from the drawings.
Figure 2:
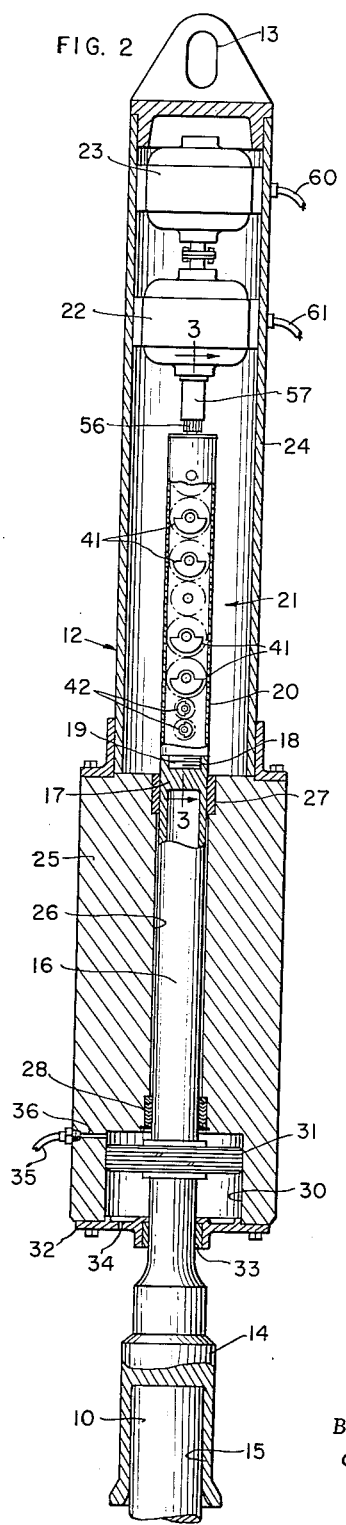
FIGURE 2 is a section taken on line 2—2 of FIGURE 1.

In FIGURES 1 and 2, numeral 10 designates generally a cylindrical pile, with its lower end in engagement with the earth 11, and with its upper end carrying a pile driving assembly 12 in accordance with the invention, equipment for hoisting the apparatus into the position shown, and for suspending it in such position, being omitted from the drawing. It will be understood, however, that any suitable hoisting equipment such as a crane and block and tackle equipment furnished with a hook engageable with the eye 13 at the upper end of the pile driving assembly, may be used. Suitable equipment of this nature is shown in my aforesaid application Serial Number 644,774. It may also be mentioned at this point that while I have shown in FIGURES 1 and 2 a simple form of cylindrical pile, other forms such as H-section steel piles, or other known or suitable forms, are suitable to the practice of the invention, provided only that they have a degree of elasticity permitting necessary standing wave action therein.

The pile driving assembly 12 includes an adapter 14 comprising a socket 15 adapted to receive the upper end portion of the pile 10. Extending upwards from this adapter 14 is a reduced tubular stem 16, closed at its upper end, as indicated at 17, and formed at the top with a threaded socket 18 into which is screwed a threaded coupling member 19, formed on the lower end of the cylindrical hollow body or barrel 20 of vibration generator 21. Generator 21 is driven from a pair of electric motors 22 and 23 fixedly mounted in a cylindrical casing 24, which is tightly mounted at its lower end on top of a heavy cylindrical body 25, provided with a central longitudinal bore 26 which receives the aforementioned stem 16 with a small clearance as indicated. A bearing bushing 27 fitted in body 25 at the upper end of bore 26 supports stem 16 for free vertical sliding movement, and near the lower end of the body 25, a packing unit 28 is mounted for packing the stem 16.

A large bore 30 extending upwardly into the lower end of body 25 affords a cylinder in which works a piston 31 tightly mounted on stem 16, the lower end of said cylinder being closed by a bottom plate 32 secured to the lower end of body 25. This bottom plate 32 is provided with a bearing bushing 33 slidingly supporting stem 16 below piston 31, and is provided also with an air vent hole 34. Air under pressure is introduced to the cylinder surface above piston 31 via air hose 35 and passage 36 in body 25.

Vibration generator 21 (see FIGURES 2 and 3) comprises a device for generating and applying to the upper end of stem 16, and thence, through adapter 14 to the upper end of pile 10, a vertically-directed alternating force having both fundamental and harmonic wave frequencies capable of resonating the pile 10. That is to say, the vibration generator applies to the pile 10 a complex force wave which sets up in the pile both a fundamental and a harmonic resonant standing wave, or in still other language, sets up in the pile a complex standing wave action which is the resultant of a fundamental half-wavelength standing wave, and a harmonic thereof, in this case the second harmonic. The generator includes the aforementioned tubular housing 20, screwcoupled at its lower end to the upper end of the aforementioned stem 16. The upper end of housing 20 is closed by means of a closure or plug member 40. The housing 20 encloses a series of vertically spaced, fundamental-frequency unbalanced rotors 41, in this case four in number, and in addition, a series of harmonic frequency unbalanced rotors 42, in this case two in number. These rotors are all rotatably mounted on transverse shafts 43 set tightly into the walls of housing 20. The rotors 41 include intermeshing gears 44, and the rotors 42 include intermeshing gears 45. In the illustrative embodiment, the rotors 41 are separated into two upper rotors and two lower rotors, interconnected by an idler gear 47 on a shaft 48 rotatably mounted in suitable bearings in the walls of housing 20. The gear 45 of uppermost rotor 42 meshes with the gear of the lowermost rotor 41. Gears 45 of harmonic frequency rotors 42 are half the diameter of the gears 44 for fundamental frequency rotors 41, so that rotors 42 turn at twice the angular velocity of rotors 41. In other words, rotors 42 make two revolutions for each revolution of rotors 41, and are therefore of double or second harmonic frequency.

Gear 44 for uppermost rotor 41 is driven by pinion 50 on rotatable shaft 51, carrying a bevel gear pinion 52 driven from bevel gear 53 on vertical shaft 54, the latter being supported by suitable bearings 55 mounted within closure 40, and being provided above the latter with a splined section 56 received within an internally splined hollow drive shaft 57 extending downwardly from coupled electric drive motors 22 and 23.

The motors 22 and 23 are variable speed electric motors, and may be, for example, induction motors driven by power at variable frequency from a generator having as a prime mover a variable speed gas engine. In some instances an ordinary induction load will have enough "slip" so that it can be driven by a regular 60-cycle or other suitable fixed frequency source.

The unbalanced fundamental frequency rotors 41 are so phased with relation to one another that all of their unbalanced or eccentirc weight portions move up and down in synchronism with one another. The vertical components of force owing to these unbalanced rotors are therefore in phase and additive.

Figure 3:
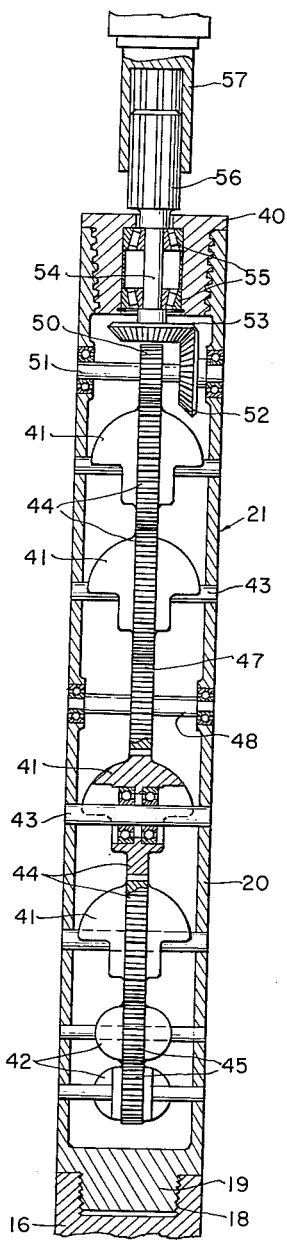
FIGURE 3 is a section on line 3—3 of FIGURE 2.

It will be seen that the upper and lower rotors 41 rotate in the same direction, while the two intermediate rotors 41 rotate in the same direction, but in the opposite direction to the upper and lower rotors. Accordingly, lateral components of force are balanced out. Likewise, couples tending to rotate the generator about a transverse axis are avoided. According to the illustrative arrangement, two double frequency rotors 42 are used, but it is to be understood that, for a stronger second harmonic, additional double frequency rotors 42 may be added. Because of the half-size of the rotors 42 as compared with the rotors 41, necessitated by the half-size gears 45, the forces contributed by the individual rotors 42 will be slightly less than the forces contributed by the rotors 41, even though the smaller rotors operate at twice the centrifugal speed. It will be obvious that the number of rotors 42 may be increased as much as desired, so that any desired relationship between forces generated by the rotors 41 and the rotors 42 may be achieved. It is evident that by a suitable increase in the number of rotors 42, the total force exerted thereby may, for example, be made equal to the total force generated by the rotors 41. The rotors 42 are phased to move vertically in synchronism with one another, so that the vertical components of force will be additive, whereas the horizontal components of force will be cancelled. Double frequency rotors 42, moreover, may have various phase relationships to the fundamental frequency rotors 41 within the broad scope of the invention. However, preferably, particularly for driving in hard formation the rotors 42 are phased as illustrated in FIGURES 2 and 3, such that they are at the midpoint of their downstrokes while the upper rotors 41 are both at the top and at the bottom of their strokes. Thus, in FIGURES 2 and 3, the fundamental frequency rotors 41 are all at the top of their strokes while the rotors 42 are at the midpoint of their downstrokes. It will also be evident that when the rotors 41 are at the bottom of their downstrokes, the rotors 42 will again be at the midpoint of their downstrokes. As mentioned, other phase relationships are possible, an example of which will be described later, but that here shown and described is preferred.

To drive a pile, the pile with the driving assembly 12 fitted to its upper end, is hoisted into the position shown in FIGURE 1, and motors 22 and 23 are operated through power furnished via conductors indicated at 60 and 61. The motors drive the generator shaft 56, rotating the unbalanced rotors 41 and 42. This results in a complex alternating force being generated in a vertical direction, the force from each unbalanced rotor being exerted through its mounting shaft onto the generator housing 20, and being thence applied to the upper end of stem 16, and from the lower end of stem 16 through adapter 14 to the upper end of the pile 10. Air under pressure is maintained in the piston chamber above the piston 31 during operation, and it will be seen that the weight of the massive body 25, the casing 24, and the drive motors 22 and 23, is supported on the piston 31 through the body of air under compression above the latter. This weight is transferred from piston 31 to stem 16 and adapter 14 and thence to the upper end of the pile, whereby the pile is biased downwardly by a substantial weight. The body of air under compression between the piston 31 and the heavy body 25 thus acts as an air spring, permitting relative vertical vibration of vibration generator 21, stem 16, adapter 14 and the upper end portion of the pile relative to the massive body 25, casing 24 and the motors 22 and 23. The splined driving connection at 56, 57 permits relative reciprocation at that point.

Motors 22 and 23 are operated at a speed such as to cause the fundamental frequency rotors 41 to generate a vertically-directed alternating force at a frequency which is a resonant frequency of pile 10 for a longitudinal mode of standing wave vibration of the pile. Usually, and preferably, the frequency of the rotors 41 is made such as to generate a half-wavelength standing wave in the pile, so that the pile acts as a "free-free" bar, with velocity antinodes at its ends, and a stress antinode at the midpoint. Under these conditions, and disregarding for the time being the double frequency rotors 42, the two upper and lower half-lengths of the pile alternately elastically elongate and contract in step with one another, the cumulative amplitude of the elastic deformation or displacement, measured from the nodal midpoint of the pile, progressively increasing toward each end. The midpoint of the pile, if it were not for the double frequency rotors 42, would under the circumstances assumed have no substantial vibration.

For a complete understanding of the invention, reference is next directed to the chart of FIGURE 4, and first to part A thereof, illustrating the just-described standing wave action of the pile when subjected only to the alternating force exerted by the synchronized fundamental frequency rotors 41. The pile is designated again by the numeral 10, and is shown in five successive positions, corresponding to successive 90° spaced positions of the rotors 41, so that one complete cycle of vibration is represented. The midpoint of the pile, at A, B and D, is marked for identification with a short horizontal line *m*. The corresponding position of one of the synchronized rotors 41 is shown over the pile in each position of the pile. For simplicity we are assuming the typical case where pile motion is in phase with rotor force. The solid arrows below the representations of the rotor represent the direction of the force exerted by the rotor on the pile in that position. The dotted arrows indicate the components of vertical velocity of the rotors. The alternating force exerted on the pile, at the fundamental frequency for half-wavelength standing wave vibration of the pile, causes the pile to alternately elastically contract and elongate, as represented in the successive pile positions shown. It will be observed that the vertical force wave lags the vertical component of rotor velocity by 90°. Thus, for example, at the 90° position, the rotor is rising at maximum velocity, but the vertical force exerted thereby is zero. At 180°, the rotor is at the top, exerting a maximum upward force component (by reason of its centrifugal force), while its vertical component of velocity is zero. It will further be seen that the longitudinal displacements of the pile lag the vertical force wave by 90°. Thus, in the first position, the rotor 41 is at the bottom, exerting a maximum downward force, the vertical velocity of the rotor is zero, and the pile is at its normal length, but is contracting at maximum velocity. In the second position, 90° later, the rotor is rising at maximum velocity, vertical force is zero, the pile is contracted to its minimum length, and is momentarily at zero vertical velocity. The conditions for the third, fourth and fifth positions will be readily understood from the diagrams.

In FIGURE 4, at C, is shown in dashed lines a sinusoidal wave 70 representing the displacement of the lower end of the pile above and below the zero (normal length) axis for the fundamental frequency action depicted at A. This curve will be seen to be the same as the dashed line curve drawn through the lower end of the pile in the successive positions shown at A. This wave 70 is one component of the resultant complex lower end displacement wave, as will appear presently.

At B in FIGURE 4 are shown successive positions of the pile 10 with only the wave action therein owing to the double frequency or second harmonic rotors 42. In other words, the positions at B show only the second harmonic action, the pile being assumed as having no fundamental frequency action. The actual overall action, of course, is the resultant of the two component actions represented at A and B. The second harmonic wave is characterized by a velocity antinode at each end of the pile and at the midpoint thereof, with stress antinodes at the quarter and three-quarter points. Accordingly, the two half-lengths of the pile elongate and contract with 180° phase difference. In other words, one half-length elongates as the other contracts, and vice versa. The two component wave actions shown at A and B are in the phase relation previously described, i.e., with the harmonic rotors 42 at the midpoints of their downstrokes while the fundamental frequency rotors are passing through both the upper and lower ends of their strokes. In the second harmonic case, B, as in the fundamental, A, the vertical alternating force component exerted on the pile by the second harmonic rotors 42 lags the vertical component of rotor velocity by 90°. Further, the longitudinal displacements of the pile ends lag the vertical force wave by 90°. In the fundamental frequency case A, however, the two ends of the pile move equally and oppositely, while in the second harmonic case B, the two ends of the pile move equally, but in the same direction.

Sinusoidal dash-line wave 71 at C represents the displacement of the lower end of the pile owing to the second harmonic wave action depicted at B. Curve 72, at C, is the resultant of curves 70 and 71, and represents the complex motion of the lower end of the pile owing to the combined fundamental and second harmonic wave actions represented at A and B. It will be observed that the wave 72 representative of the motions of the lower end of the pile includes a peaked double amplitude portion 73. The slope of the sides of this wave portion 73 represents the velocity of downward motion of the pile, and it will be seen from the curve that the pile is quickly accelerated to a high velocity, and then travels downward at this high velocity for a substantial distance, followed by a sharp deceleration at the bottom. This action is especially effective in breaking and penetrating hard formation.

At D is represented an alternative phase relation of the second harmonic rotor 42 to the fundamental frequency rotor 41 of A. In this case, the rotors 41 and 42 pass through the lower ends of their strokes together. The fundamental frequency lower pile-end displacement wave component is indicated at E by reference numeral 71*a*. The resultant complex motion of the lower pile-end is shown at 72*a*, and it will be observed that substantial amplitude and downward velocity are again attained.

The combination of the fundamental and second harmonic waves thus provides an effective wave form for the motion of the bottom end of the pile.

A very important benefit of the invention, however, is the creation of an additional velocity antinode at the midpoint of the pile, whereby the entire length of the pile is in vibratory motion, and static friction otherwise troublesome in the mid-region of the pile is virtually eliminated.

The drawings and description will be understood as merely illustrative of one selected embodiment of the invention, and various changes in design, structure and arrangement may obviously be made without departing from the spirit and scope of the invention as defined by the appended claims.

I claim:

1. Acoustic pile driving apparatus for driving a pile into the earth, comprising: vibratory body means, vibration transmitting pile coupling means on said body means drivingly engageable with the upper end portion of a pile, and cyclic force generating means mounted on said vibratory body means for exerting thereon a vertically directed alternating force component at a fundamental longitudinal resonant standing wave frequency of the pile and simultaneously therewith a vertically directed alternating force component at a harmonic longitudinal resonant standing wave frequency of the pile, whereby to establish in said pile a complex longitudinal standing wave which is the resultant of a fundamental frequency longitudinal resonant standing wave and a harmonic frequency longitudinal resonant standing wave.

2. The subject matter of claim 1, wherein the harmonic frequency is the second harmonic.

3. Acoustic pile driving apparatus for driving a pile into the earth, comprising: vibratory body means, vibration transmitting pile coupling means on said body means drivingly engageable with the upper end portion of a pile, a fundamental frequency cyclic force-generating means mounted on said vibratory body means for exerting thereon a vertically directed alternating force component at a fundamental longitudinal resonant standing wave frequency of the pile, and a harmonic frequency cyclic force generating means mounted on said body means for simultaneously exerting thereon a vertically directed alternating force component at a harmonic longitudinal resonant standing wave frequency of the pile, whereby to establish in said pile a complex longitudinal standing wave which is the resultant of a fundamental frequency longitudinal resonant standing wave and a harmonic frequency longitudinal resonant standing wave.

4. The subject matter of claim 3, wherein the harmonic frequency is the second harmonic.

5. An acoustic pile driver comprising: a vibration generating means for generating an alternating force along a longitudinal direction line of the pile to be driven at a resonant longitudinal standing wave frequency of the pile, pile coupling means connected to said generating means and drivingly engageable with the pile, massive body structure affording a massive loading reaction, and spring support means between said massive body structure and coupling means by which said massive body structure is spring supported by said pile.

6. The subject matter of claim 5, wherein said spring support means comprises an air spring embodying an air compression chamber.

7. The subject matter of claim 5, including a motor means for powering said vibration generating means, a vibration-isolating drive coupling between said motor means and said generating means, and means supporting said motor means on said body structure, whereby said motor means is spring supported from the pile along with said massive body structure.

8. The apparatus of claim 5, wherein said pile coupling means includes an embracement member which provides a wall structure surrounding a portion of the pile.

9. The apparatus of claim 5, wherein said pile coupling means includes a pressure contact means for imposing on said pile both the output force of said vibration generating means and the longitudinal loading by said body structure.

References Cited in the file of this patent

UNITED STATES PATENTS

| | | |
|---|---|---|
| 2,013,214 | Kershaw | Sept. 3, 1935 |
| 2,225,765 | Brice | Dec. 24, 1940 |
| 2,423,301 | Fairchild | July 1, 1947 |
| 2,663,152 | Hart | Dec. 22, 1953 |
| 2,672,322 | Bodine | Mar. 16, 1954 |
| 2,717,763 | Bodine | Sept. 13, 1955 |
| 2,743,585 | Berthet | May 1, 1956 |
| 2,798,363 | Hazak | July 9, 1957 |
| 2,867,984 | Desvaux | Jan. 13, 1959 |

FOREIGN PATENTS

| | | |
|---|---|---|
| 726,660 | Germany | Sept. 10, 1942 |

OTHER REFERENCES

Engineering News Record magazine reprint, May 13, 1948, pages 84–87 (Vibration Testing of Friction Piles).